Patented Aug. 28, 1951

2,565,670

UNITED STATES PATENT OFFICE 2,565,670

PRODUCTION OF THE 17-MONOBENZOATE ESTER OF $\Delta^{5,6}$-ANDROSTENE-3,17-DIOL

Ralph Wechsler, Maplewood, and Joseph Levy, Union, N. J., assignors to Nopco Chemical Company, Harrison, N. J., a corporation of New Jersey No Drawing. Application June 8, 1949,
Serial No. 97,930

8 Claims. (Cl. 260—397.5)

This invention relates to derivatives of androstene diol and more particularly to the 17-monobenzoate ester of $\Delta^{5,6}$-androstene-3,17-diol.

Derivatives of androstene are employed to a considerable extent in the synthesis of sex hormones. One of the derivatives which is quite widely used for such purposes is the 17-monobenzoate ester of $\Delta^{5,6}$-androstene-3,17-diol. Various means for producing this ester have been proposed in the prior art. One of the methods which is employed for the production of this ester is that of partial saponification of either mixed or homogeneous diesters of $\Delta^{5,6}$-androstene-3,17-diol. Some of the earliest work on such a process was carried out by Ruzicka and coworkers—see Helv. Chim. Acta. 18, 1478 (1935) and U. S. Patent No. 2,387,469. Additional information on such a process may be found in F. I. A. T. Final Report No. 996, prepared by the Field Information Agency, Technical United States Group Control Council for Germany entitled "The Commercial Development and Manufacture of Synthetic Hormones in Germany." In this report, written by Carl R. Addinall, the process employed in Germany by Schering A. G. for the production of the 17-monobenzoate ester of $\Delta^{5,6}$-androstene-3,17-diol is given. The Ruzicka process and the Schering process principally concern the use of the 3-acetate-17-benzoate ester of $\Delta^{5,6}$-androstene-3,17-diol for the production of the 17-monobenzoate ester. Ruzicka in the U. S. patent does mention that homogeneous diesters of $\Delta^{5,6}$-androstene-3,17-diol may be subjected to partial saponification to produce the 17-monoesters of the diol; however, there is no specific disclosure of the production of the 17-monobenzoate ester from the 3,17-dibenzoate ester. It might be inferred from the patent that the monobenzoate ester could be prepared from the dibenzoate ester but there is little specific information in the patent to show that such was actually done. Thus it might be inferred from Example II of the patent that the 17-monobenzoate ester had been prepared from the dibenzoate ester of androstene diol, but there is no definite statement to that effect nor is any information given as to what yield if any might have been obtained in such a reaction if such reaction were actually carried out. Furthermore, we have attempted to prepare the 17-monobenzoate ester in accordance with the procedure set forth in Example II of the U. S. patent and we have found that this procedure will not produce the monobenzoate ester, at least not in any significant amount. Thus we admixed 2.5 grams of the dibenzoate ester of $\Delta^{5,6}$-androstene-3,17-diol with 375 mls. of dry methanol containing 0.33 gram of KOH (one mole proportion). The reaction mixture was allowed to stand for 48 hours (8 hours longer than the reaction time employed in Example II of the U. S. patent) at room temperature. The dibenzoate ester failed to dissolve in the methanol indicating that no reaction occurred. The reaction mixture was then acidified with acetic acid to neutralize the alkali therein, and the reaction mixture was then filtered without any concentration of the mixture. There was obtained 2.37 grams of plate-like crystals which were the unchanged dibenzoate ester. It is apparent, therefore, that the procedure of Example II of the U. S. patent of Ruzicka et al., although possibly being suitable for the production of the mono-acetate ester from the diacetate ester, will not produce the monobenzoate ester of androstene diol from the dibenzoate ester in any significant amount. The fact that no yield of monobenzoate ester could be obtained is possibly due to the very low solubility of the dibenzoate ester in methanol (about 0.023 gram per 100 ml. at room temperature). The diacetate ester, however, is far more soluble in methanol at room temperature than the dibenzoate ester and it is very possible that this is why Ruzicka was able to produce the 17-monoacetate ester by partial saponification of the diacetate ester in accordance with the procedure set forth in Example II of the patent.

It is the object of this invention to provide an effective process for producing the 17-monobenzoate ester of $\Delta^{5,6}$-androstene-3,17-diol from the dibenzoate esters of the $\Delta^{5,6}$-androstene-3,17-diol.

A further object of the invention is to provide an improved process for producing the 17-monobenzoate ester of $\Delta^{5,6}$-androstene-3,17-diol from the free $\Delta^{5,6}$-androstene-3,17-diol.

Other objects of the invention will in part be obvious and will in part appear hereinafter.

It has now been discovered that the above and other objects of the invention may be realized by admixing the dibenzoate ester of $\Delta^{5,6}$-androstene-3,17-diol with methanol and a saponification agent and heating the reaction mixture at a temperature above about 50° C. and preferably at or near the reflux temperature of the methanol until the dibenzoate ester is converted to a mixture of 17-monobenzoate ester and free diol, and then separating the 17-monobenzoate ester from the free diol.

By the process of our invention it is possible to obtain the 17-monobenzoate ester of the $\Delta^{5,6}$- androstene-3,17-diol in yields of from about 40% to 45% in a single saponification. The free $\Delta^{5,6}$-androstene-3,17-diol which is also formed by the saponification is readily reconverted to the dibenzoate ester by benzoylation with a reagent such as benzoyl chloride, and the dibenzoate ester which is thus obtained is then again subjected to partial saponification in accordance with the procedure of the invention. By such a recycling process from about 80% to 85% of the original dibenzoate ester can be converted to the 17-monobenzoate ester in from 4 to 5 cycles with a loss of material of only about 5%. Ordinarily about 10% to 15% of the original dibenzoate will be recovered as free diol and then reconverted to the dibenzoate ester at the end of about the fifth cycle. Thus on the basis of the amount of dibenzoate ester actually used up in the procedure, yields of the 17-monobenzoate ester of better than 90% are obtained.

In carrying out the partial saponification of the dibenzoate ester in accordance with the process of the invention, a ratio of methanol to dibenzoate ester of from about 100 mls. of methanol per gram of ester to 250 mls. of methanol per gram of ester is preferably employed. The dibenzoate ester, of course, for all practical purposes is completely insoluble in the methanol at such ratios and it will initially merely be dispersed therein during the carrying out of the reaction. As the dibenzoate ester is converted to the mixture of monobenzoate ester and free diol, the reaction mixture will gradually become a clear solution inasmuch as both the monobenzoate ester and the free diol are completely soluble in the proportions of methanol employed in the process.

The amount of alkali, e. g. sodium hydroxide, potassium hydroxide, etc., which is employed in the process is preferably the amount theoretically necessary to saponify all of the dibenzoate ester to the monobenzoate ester. As a practical matter, it is not necessary to employ this large an amount of alkali inasmuch as the partial saponification actually proceeds mainly as a transesterification reaction. Thus we have found that in certain instances the amount of alkali which is actually consumed in the reaction will be less than 10% of that theoretically required. Therefore, it is evident that the alkali acts principally as a catalyst for a transesterification reaction between the alcohol and the diester with the benzoate radicle from the 3 position combining with the methyl alcohol to form methyl benzoate. This phenomena was pointed out by Ruzicka et al. in their patent (see U. S. Patent No. 2,387,469, page 2, column 1, lines 37 to 43). It is evident, therefore, that if desired one may use an amount of alkali somewhat less than the amount theoretically required. If desired, of course, amounts of alkali slightly in excess of the amount theoretically needed can be used.

In carrying out the process of the invention, the reaction mixture is heated to a temperature of above about 50° C. For ease and simplicity of operation, it is greatly preferred to carry out the reaction at the reflux temperature of the methanol, i. e. at about 65° C. The reaction mixture is heated, preferably with stirring, until all of the dispersed dibenzoate ester has disappeared and for a short time thereafter, preferably for a period of approximately one to two hours thereafter. The amount of heating required to cause all of the dispersed dibenzoate to disappear and the reaction mixture to be converted to a clear solution appears to depend to some extent upon the size of the individual particles of the dibenzoate ester. We have found that when the dibenzoate ester is reduced to a fine powder prior to carrying out the partial saponification reaction, all of the dibenzoate ester will disappear and a clear solution will be formed on heating the reaction mixture at the reflux temperature of the methanol for a period of not more than about six hours. However, when the crystalline dibenzoate ester is not converted to a fine powdery form prior to the saponification, it may require as much as nine hours or more to eliminate all of the dibenzoate ester and form a clear solution of the reaction mixture. If one wishes to obtain the 17-monobenzoate ester in a relatively pure form, it is imperative that all of the dibenzoate ester be converted to the 17-monobenzoate ester, or in part to the free diol, since the diester is separated from the monoester with great difficulty even when present in small amounts because of its low solubility. The 17-monobenzoate ester, however, can be readily recovered in a very pure form if the dibenzoate ester is completely converted to a mixture of the 17-monobenzoate ester and the free diol since the latter two compounds can be readily separated from each other as will be fully explained hereinafter. As far as carrying out the saponification is concerned, the important point is to heat the reaction mixture until the dispersed dibenzoate has disappeared and then for a short time, e. g. about one to two hours, thereafter in order to insure complete reaction of the diester. However, if it is desired to determine for any reason whether any diester remains unsaponified, a small portion of the reaction mixture may be taken and that portion concentrated by removing about three-fourths of the methanol contained therein and then cooling the concentrated portion to a temperature of about 5° C. Because of its low solubility, the diester, even when present in small amounts, crystallizes along with the monoester. Accordingly the melting point of the crystals which are formed in the cooled concentrated portion serves as an excellent criterion for the presence of unreacted diester in the product. If as little as about 3% to 5% of the dibenozate ester is present in the crystals, the melting point of the crystals will be reduced to about 10° to 15° C. below the melting point of the pure monobenzoate ester. Thus a highly satisfactory test is available to determine the completeness of the reaction and to determine whether or not the reaction mixture should be further heated in order to obtain the desired end product.

After the reaction mixture has been heated for the desired length of time, the 17-monobenzoate ester is recovered therefrom. This can readily be done by concentrating the reaction mixture to about one-third to one-fourth of its original volume by distilling methanol from the mixture. To prevent saponification of the monobenzoate ester during this concentration, the saponification agent is neutralized with a suitable acidic material such as acetic acid, hydrochloric acid, etc., prior to the concentration step. The concentrated solution is then cooled to a temperature somewhat below room temperature, for example, 0° to 10° C., and the crystalline material which separates is filtered, centrifuged or otherwise suitably removed from the methanol. This crystallized material will be desired 17-monobenzoate ester of the $\Delta^{5,6}$-androstene-3,17-diol. Additional amounts of the 17-monobenzoate ester may be recovered from the remaining methanol solution by one or two additional concentrations and crystallizations in the same manner. In all cases it will be found that a yield of from about 40% to 45% or more of the desired 17-monobenzoate ester will be obtained. This means, of course, that from about 55% to 60% of the dibenzoate ester will have been converted to free $\Delta^{5,6}$-androstene-3,17-diol. This free diol is extremely soluble in the methanol, relatively speaking, and remains in solution therein during the various steps of crystallizing the 17-monobenzoate ester. The free $\Delta^{5,6}$-androstene-3,17-diol can readily be recovered either by distilling off all of the methanol from the remaining methanol solution, or it can readily be recovered by admixing the remaining methanol solution with an excess of water, adding sufficient alkali solution, e. g. 20% sodium hydroxide solution, to render the mixture alkaline and thus dissolve the benzoic acid present by forming a water-soluble salt of the benzoic acid, and then filtering off the free diol which is insoluble in the aqueous methanol mixture. The $\Delta^{5,6}$-androstene-2,17-diol which is thus recovered is washed free of alkali, dried and then reconverted to the dibenzoate ester by well known means as, for example, by benzoylation with benzoyl chloride in a pyridine solution. The dibenzoate ester which is thus produced may then be recycled employing the procedure as set forth hereinabove. As has already been pointed out, it is possible by such a recycling procedure to convert the original dibenzoate ester to the 17-monobenzoate ester in better than 90% yields with little loss of the valuable $\Delta^{5,6}$-androstene-3-17-diol.

The dibenzoate ester which we employ in our novel process may be obtained from any suitable source. The process of our invention is particularly valuable as an adjunct to processes for preparing the 17-monobenzoate ester from the 3-acetate-17-benzoate ester of $\Delta^{5,6}$-androstene-3,17-diol since in such processes there is usually at least 5% or more of free $\Delta^{5,6}$-androstene-3,17-diol formed. Prior to the discovery of our novel process, there has been no commercially satisfactory means for taking the free diol and transforming it into the valuable 17-monobenzoate ester thereof. As is clearly evident, however, from the above description, the process of our invention provides a highly suitable means for converting the otherwise relatively valueless diol into the highly valuable 17-monobenzoate ester thereof.

For a fuller understanding of the nature and objects of the invention, reference may be had to the following examples which are given merely as further illustrations of the invention and are not to be construed in a limiting sense.

Example I

The dibenzoate ester of $\Delta^{5,6}$-androstene-3,17-diol was converted to the 17-monobenzoate ester thereof by admixing 50 gms. of the recrystallized dibenzoate ester (M. P. 218–220° C.) with 7500 ml. of dry methanol containing 6.6 gms. of KOH. This mixture was refluxed until all of the suspended dibenzoate ester had disappeared to give a clear solution and then for an additional 2 hours. The total reflux time was 10 hours. The solution was cooled, acidified with glacial acetic acid, and then concentrated under vacuum to about 2000 mls. The concentrated solution was then chilled to a temperature of about 5° C. and the crystals which formed at this temperature were filtered off. A yield of 14.07 gms. of crystals of the 17-monobenzoate ester melting at 220–223° C. was recovered in this first crystallization. The methanol filtrate was then further concentrated to a volume of about 500 mls. and again chilled to about 5° C. A second crop of 4.51 gms. of crystals of the 17-monobenzoate ester melting at 215–219° C. was recovered. Inasmuch as this second crop was not as pure as desired, it was recrystallized from 250 mls. of methanol to give a first crop of 3.18 gms. of crystals melting at 220–223° C. and a second crop of 0.3 gm. of crystals melting at 219–221° C. The total yield of the 17-monobenzoate ester was 17.55 gms. or a total yield of 44.5% of the yield theoretically obtainable from the total amount of dibenzoate ester employed as the starting material.

The combined methanol filtrate was poured into 5 volumes of water and a 20% NaOH solution added to the aqueous mixture until it was alkaline in order to convert the benzoic acid present in the mixture to the water-soluble sodium benzoate. The $\Delta^{5,6}$-androstene-3,17-diol which had been formed was insoluble in this aqueous mixture and it was readily filtered therefrom. It was then washed free of alkali with water and dried, giving a recovery of 16.7 gms. of free $\Delta^{5,6}$-androstene-3,17-diol. This free diol was then reconverted to the dibenzoate ester by dissolving the diol in four volumes of pyridine and treating the mixture with two volumes of benzoyl chloride. The reaction mixture was heated at 100° C. for two hours, then poured into water and the aqueous mixture filtered to recover the precipitated dibenzoate ester. The crude diester was purified by digesting it with methanol and filtering off the methanol. The yield of the dibenzoate ester was 26.5 gms. which was equal to 53% of the dibenzoate ester employed as the original starting material. It is thus seen that a material balance of 97.5% was obtained.

Example II

Two series of experiments were carried out employing the procedure described in Example I. Each series comprised the partial saponification of a given quantity of the dibenzoate ester of $\Delta^{5,6}$-androstene-3,17-diol by the partial saponification procedure described in Example I, recovering both the 17-monobenzoate ester and the free diol, reconverting the free diol to the dibenzoate ester, and then repeating the partial saponification procedure on the dibenzoate ester thus formed. In each series this recycling procedure was repeated until a total of five partial saponifications had been carried out in each series. In the first series, yields of 17-monobenzoate ester of 43.6%, 43%, 41.3%, 34% and 39.3% were obtained in the first, second, third, fourth and fifth cycles respectively. These yields were based on the amount of dibenzoate ester employed as the starting material in each respective cycle. The total yield of 17-monobenzoate ester was 81% of the yield theoretically obtainable from the amount of dibenzoate ester employed as the original starting material. The free $\Delta^{5,6}$-androstene-3,17-diol recovered at the end of the fifth cycle was reconverted to the dibenzoate ester as in Example I, and this diester amounted to 11.4% of the original starting material. Therefore there was only a 7.6% loss of material during the entire five cycles. Based on the amount of 17-monobenzoate obtained plus the amount of material lost during the five cycles, i. e. not considering the dibenzoate ester recovered at the end of the fifth cycle since it can be combined with dibenzoate ester from other sources and recycled again as many times as desired or can be recycled by itself if desired, a yield of the 17-monbenzoate ester of 91.5% was obtained.

In the second series, which was a continuation of the experiment of Example I with the first cycle of this series making up the experiment of Example I, yields of the 17-monobenzoate ester of 44.5%, 38.4%, 42.6%, 33.2% and 39.3% respectively were obtained in the five cycles with a total yield of 79.6% of the monobenzoate ester based on the amount of dibenzoate ester employed as the original starting material. At the end of the fifth cycle, the amount of dibenzoate ester recovered was 14.2% of the amount of dibenzoate ester employed as the original starting material. Therefore only 6.2% of the original dibenzoate ester had been lost during the five cycles. Based on the amount of dibenzoate ester actually used up, i. e. 79.6% plus 6.2%, the yield of the 17-monobenzoate ester was 92.7%. In both series, the 17-monobenzoate ester produced in each cycle had the same excellent quality as the product of Example I.

*Example III*

Another partial saponification of the dibenzoate ester of $\Delta^{5,6}$-androstene-3,17-diol was carried out as in Example I employing the same ratios of materials and the same reaction conditions except that the reaction mixture was refluxed for only 8 hours instead of for 10 hours as in Example I. A 45.5% yield of the 17-monobenzoate ester having a melting point of 219–221° C. was obtained.

*Example IV*

The 17-monobenzoate ester of $\Delta^{5,6}$-androstene-3,17-diol was prepared in a manner similar to that employed in Example I. In the present experiment, however, a ratio of 200 mls. of methanol per each gram of dibenzoate ester was employed instead of 150 mls. of methanol per gram of diester as in Example I. The 17-monobenzoate ester was recovered in a yield of 45.9%. The product had the same high degree of purity as the product of Example I.

*Example V*

Another experiment was carried out in a manner similarly as in Example I; however, a 50% greater concentration of alkali, i. e. a one and one-half mole proportion instead of a one mole proportion of alkali to dibenzoate ester, was employed. Only four hours refluxing of the reaction mixture was required to cause all of the dispersed dibenzoate ester to disappear and the reaction mixture to become a clear solution. The reaction mixture was refluxed for one more hour, i. e. a total of five hours, and then the 17-monobenzoate ester of $\Delta^{5,6}$-androstene-3,17-diol was recovered therefrom by a procedure essentially the same as that employed in Example I. A 42.2% yield of very high quality 17-monobenzoate ester was obtained.

The procedure of our invention is the only practical means of which we are aware for utilizing the free $\Delta^{5,6}$-androstene-3,17-diol formed during partial saponification of diesters of $\Delta^{5,6}$-androstene-3,17-diol. It is not practical to form a mixed diester from the free diol, and therefore unless one can convert a homogeneous diester to the monoester thereof in a practicable manner, the diol produced as a by-product of a partial saponification reaction cannot be readily utilized. (As is well known, of course, mixed diesters such as the 3-acetate-17-benzoate ester of androstene diol are not readily formed by esterification of the free diol but are preferably formed by first esterifying the hydroxy group of 3-hydroxy-17-keto-$\Delta^{5,6}$-androstene, then reducing the keto group on the 17 position to a hydroxyl group and then esterifying that hydroxyl group with an acyl group different from the one used to esterify the hydroxyl group on the 3 position.) The readily available homogeneous diesters other than the dibenzoate ester are unsuitable for commercial production of the monoester thereof since it is very difficult with such diesters to determine when the diester has all been saponified to the monoester or a mixture of the monoester and the free diol and since it is difficult to separate such monoesters from the free $\Delta^{5,6}$-androstene-3,17-diol because of the slight differences between the physical characteristics of such esters and the physical characteristics of the free $\Delta^{5,6}$-androstene-3,17-diol. The dibenzoate ester, on the other hand, is not subject to either of these difficulties, but prior to the development of our process there was no feasible means of partially saponifying the dibenzoate ester to the monobenzoate ester. With our novel process, it is now possible to convert what has heretofore been a relatively valueless material into a very highly valuable material.

Having described our invention, what we claim as new and desire to secure by Letters Patent is:

1. A process for the production of the 17-monobenzoate ester of $\Delta^{5,6}$-androstene-3,17-diol comprising carrying out the partial saponification of the 3,17-dibenzoate ester of $\Delta^{5,6}$-androstene-3,17-diol in methanol at a temperature above about 50° C.

2. A process for the production of the 17-monobenzoate ester of $\Delta^{5,6}$-androstene-3,17-diol comprising carrying out the partial saponification of the 3,17-dibenzoate ester of $\Delta^{5,6}$-androstene-3,17-diol in methanol at about the reflux temperature of the methanol.

3. A process for the production of the 17-monobenzoate ester of $\Delta^{5,6}$-androstene-3,17-diol comprising admixing the 3,17-dibenzoate ester of $\Delta^{5,6}$-androstene-3,17-diol with methanol in a ratio of about 100 ml. to about 250 ml. of methanol for each gram of the dibenzoate ester and then partially saponifying the dibenzoate ester in the mixture with the partial saponification being carried out at about the reflux temperature of the methanol.

4. A process for the production of the 17-monobenzoate ester of $\Delta^{5,6}$-androstene-3,17-diol comprising admixing the 3,17-dibenzoate ester of $\Delta^{5,6}$-androstene-3,17-diol with methanol in a ratio of about 100 ml. to about 250 ml. of methanol for each gram of the dibenzoate ester and with approximately the amount of alkali required to saponify the dibenzoate ester to the monobenzoate ester, heating the reaction mixture at about the reflux temperature of the methanol until the reaction mixture becomes a clear solution and for a short time thereafter, and then recovering the 17-monobenzoate ester from the reaction mixture.

5. A process for the production of the 17-monobenzoate ester of $\Delta^{5,6}$-androstene-3,17-diol comprising carrying out the partial saponification of the 3,17-dibenzoate ester of $\Delta^{5,6}$-androstene-3,17-diol in methanol at a temperature above about 50° C., recovering from the reaction mixture the 17-monobenzoate ester which is produced and also the free androstene-3,17-diol which is produced, reconverting the free diol to the 3,17-dibenzoate ester, and partially saponifying the 3,17-dibenzoate ester thus obtained employing the same procedure as in the initial saponification.

6. A process for the production of the 17-monobenzoate ester of $\Delta^{5,6}$-androstene-3,17-diol comprising carrying out the partial saponification of the 3,17-dibenzoate ester of $\Delta^{5,6}$-androstene-3,17-diol in methanol at about the reflux temperature of the methanol, recovering from the reaction mixture the 17-monobenzoate ester which is produced and also the free androstene-3,17-diol which is produced, reconverting the free diol to the 3,17-dibenzoate ester, and partially saponifying the 3,17-dibenzoate ester thus obtained employing the same procedure as in the initial saponification.

7. A process for the production of the 17-monobenzoate ester of $\Delta^{5,6}$-androstene-3,17-diol comprising admixing the 3,17-dibenzoate ester of $\Delta^{5,6}$-androstene-3,17-diol with methanol in a ratio of about 100 ml. to about 250 ml. of methanol for each gram of the dibenzoate ester, then partially saponifying the dibenzoate ester in the mixture with the partial saponification being carried out at about the reflux temperature of the methanol, recovering from the reaction mixture the 17-monobenzoate ester which is produced and also the free androstene-3,17-diol which is produced, reconverting the free diol to the 3,17-dibenzoate ester, and partially saponifying the 3,17-dibenzoate ester thus obtained employing the same procedure as in the initial saponification.

8. A process for the production of the 17-monobenzoate ester of $\Delta^{5,6}$-androstene-3,17-diol comprising admixing the 3,17-dibenzoate ester of $\Delta^{5,6}$-androstene-3,17-diol with methanol in a ratio of about 100 ml. to about 250 ml. of methanol for each gram of the dibenzoate ester and with approximately the amount of alkali required to saponify the dibenzoate ester to the monobenzoate ester, heating the reaction mixture at about the reflux temperature of the methanol until the reaction mixture becomes a clear solution and for a short time thereafter, recovering from the reaction mixture the 17-monobenzoate ester which is produced and also the free androstene-3,17-diol which is produced, reconverting the free diol to the 3,17-dibenzoate ester, and partially saponifying the 3,17-dibenzoate thus produced employing the same procedure as in the initial saponification.

RALPH WECHSLER.
JOSEPH LEVY.

REFERENCES CITED

The following references are of record in the file of this patent:

UNITED STATES PATENTS

| Number | Name | Date |
|---|---|---|
| 2,387,469 | Ruzicka | Oct. 23, 1945 |